No. 733,873. PATENTED JULY 14, 1903.
L. R. RANDALL.
COMBINED CULTIVATOR, COTTON PLANTER, AND FERTILIZER DISTRIBUTER.
APPLICATION FILED DEC. 31, 1902.
NO MODEL. 2 SHEETS—SHEET 1.
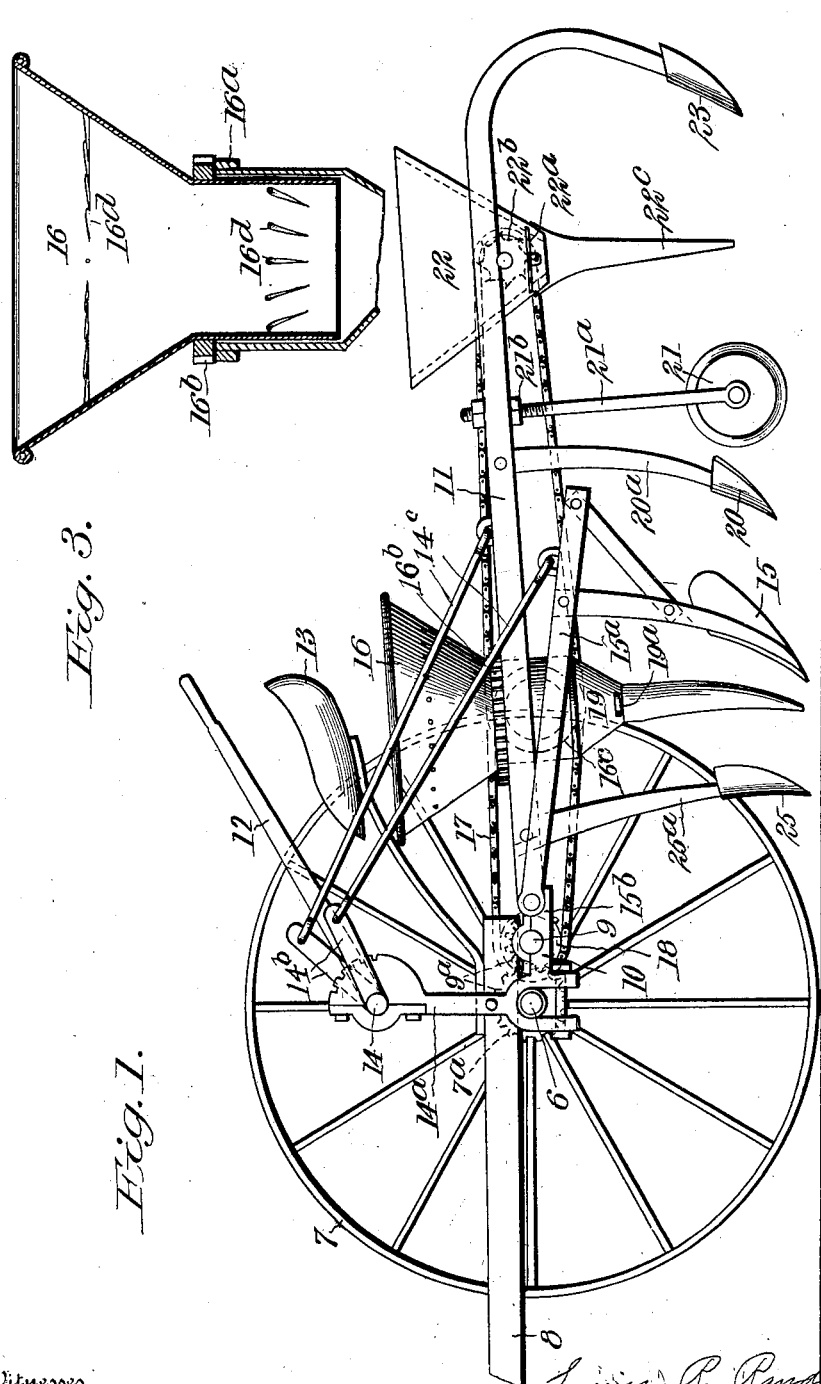
Witnesses
C. K. Walker.
Geo. E. Few.
Inventor
Lucius R. Randall
By Milo B. Stevens & Co.
Attorneys

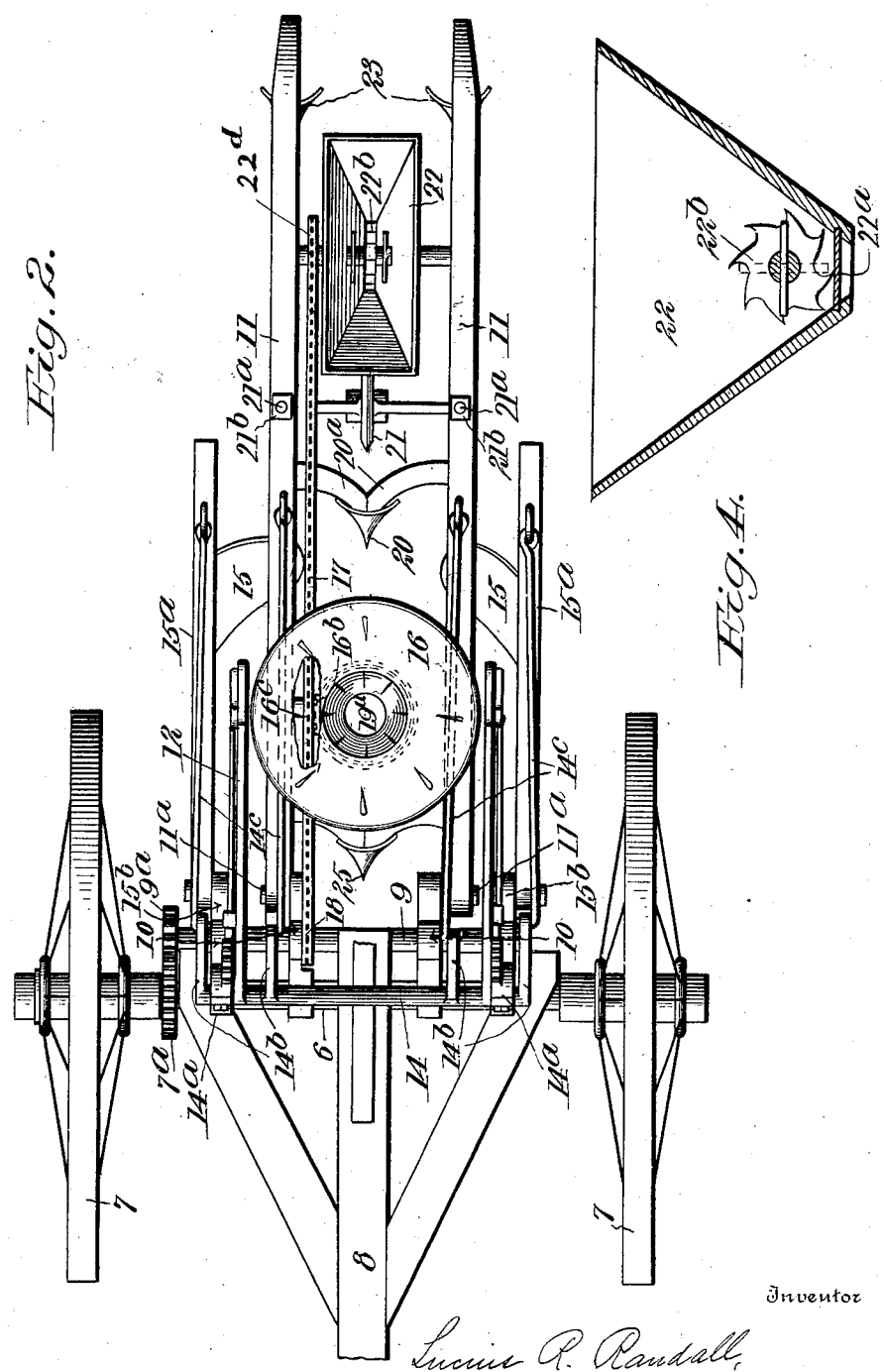

No. 733,873. Patented July 14, 1903.

UNITED STATES PATENT OFFICE.

LUCIUS R. RANDALL, OF ELZA, GEORGIA.

COMBINED CULTIVATOR, COTTON-PLANTER, AND FERTILIZER-DISTRIBUTER.

SPECIFICATION forming part of Letters Patent No. 733,873, dated July 14, 1903.

Application filed December 31, 1902. Serial No. 137,235. (No model.)

*To all whom it may concern:*

Be it known that I, LUCIUS R. RANDALL, a citizen of the United States, residing at Elza, in the county of Tatnall and State of Georgia, have invented certain new and useful Improvements in a Combined Cultivator, Cotton-Planter, and Fertilizer-Distributer; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a combined cultivator, cotton-planter, and fertilizer-distributer; and the object thereof is to form a riding implement of that class adapted to simultaneously prepare the ground, distribute the fertilizer, and deposit the seed.

A further object is to form an improved construction and operation of the fertilizer-distributer which will not clog with either wet or dry guano, thereby correcting the tendency of fertilizer, particularly when wet, to clog and stop the feed.

A further object is to form a riding-machine of the class stated in which the plows and feed-spouts can be lifted from the ground when it is desired to stop the operation.

With these and other objects in view an embodiment of the invention is hereinafter described and is illustrated in the accompanying drawings, in which—

Figure 1 is a side elevation of the machine, the near wheel being removed. Fig. 2 is a top plan view. Fig. 3 is a detail in section of the fertilizer-distributer, and Fig. 4 is a detail in vertical section of the planter.

Referring specifically to the drawings, 6 indicates the main axle, 7 the wheels, and 8 the tongue. Power to drive the movable parts of the distributer and planter is transmitted by a shaft 9, geared by spur-wheel $9^a$ to a spur-wheel $7^a$ on the hub of one of the main wheels 7. The shaft is supported on brackets 10, carried by the axle.

At 11 are indicated a pair of substantially parallel beams which are pivoted to the brackets 10, as by bolts, (indicated at $11^a$,) permitting vertical swing of the beams when it is desired to lift the planting and fertilizer-feeding devices from the ground, which object is effected by a hand-lever 12, controlling a rock-shaft 14, supported on the axle by standards $14^a$. The rock-shaft has arms $14^b$, connected to the beams by rods $14^c$. The lever is provided with the usual latch and segment.

13 indicates the seat for the operator, supported on the axle.

The beams 11, above mentioned, carry the various working parts of the machine, except a pair of turn-plows 15, the standards of which are connected to beams $15^a$, which are pivoted to brackets $15^b$ on the axle. These plows are right and left and throw the earth together to form a ridge. They are raised and lowered by connection with the rock-shaft, as above described. They also act to cover the guano dropped by the fertilizer-distributer hereinafter described.

In advance of the distributer is a shovel-plow 25, which opens the furrow for the guano. The standards $25^a$ of this plow are connected to the beams.

The distributer consists of a circular hopper 16, mounted to rotate on supports $16^a$, between the two beams 11, and it carries a ring-gear $16^b$, in mesh with the crown-teeth of a sprocket gear-wheel $16^c$, which is driven by a chain 17 from a sprocket 18 on the shaft 9. Under the mouth of the hopper is a spout 19, having a gate-valve $19^a$, controlling the amount of fertilizer delivered. Projecting from the inside of the hopper are a number of pins $16^d$, which stir the fertilizer in the hopper during the rotation. The lower pins are directed downward to work immediately above the valve-opening and assist in feeding the fertilizer through the same. The plows 15 enter immediately behind the delivery from the fertilizer-spout and ridge the earth over the fertilizer. Behind said plows is an opening shovel or plow 20, the standards $20^a$ of which are connected to the beams 11. Following the shovel is a wheel 21, supported by arms $21^a$, projecting from the beams 11. The arms are threaded at top, so that the wheel may be raised or lowered and fixed, as desired, by nuts $21^b$. The shovel and wheel serve to prepare the ground for the seed delivered from the hopper.

The hopper comprises a box 22, supported on the beams and having a gate-valve 22ª and a toothed feed-wheel 22ᵇ above the valve. Under the box is a spout 22ᶜ to direct the seed to the furrow behind the wheel 21.

Following the seed-hopper and attached to the rear ends of the beams 11 is a pair of covering-plows or scrapers 23, for an obvious purpose.

The machine above described is capable of use as a cultivator without the fertilizer and seeding devices by detaching the beams 11 at the bolts 11ª and removing the same. This will leave the turn-plows 15, which may be used to hill up and cultivate rows.

It should be stated that the feeding-wheel of the planter is driven by the chain 17, which passes around a sprocket 22ᵈ on the shaft of the fertilizer-feeding wheel.

What I claim as new, and desire to secure by Letters Patent, is—

1. The combination with a support, of a rotary fertilizer-hopper thereon, having inwardly-projecting pins to stir the fertilizer, and means to rotate the hopper.

2. The combination with the rotary hopper having inwardly-projecting pins, and a valved spout under the hopper, of means to support and rotate the hopper, substantially as described.

In testimony whereof I affix my signature in presence of two witnesses.

LUCIUS R. RANDALL.

Witnesses:
H. C. BEASLEY,
ST. JAS. B. ALEXANDER.